United States Patent
Yen

(10) Patent No.: US 7,551,651 B1
(45) Date of Patent: Jun. 23, 2009

(54) METHOD AND SYSTEM FOR TIME DOMAIN MULTIPLEXERS WITH REDUCED INTER-SYMBOL INTERFERENCE

(75) Inventor: Jeffrey C. Yen, Camarillo, CA (US)

(73) Assignee: Inphi Corporation, Westlake Village, CA (US)

( * ) Notice: Subject to any disclaimer, the term of this patent is extended or adjusted under 35 U.S.C. 154(b) by 1294 days.

(21) Appl. No.: 10/352,740

(22) Filed: Jan. 27, 2003

(51) Int. Cl.
*H04J 3/02* (2006.01)
(52) U.S. Cl. .................... 370/537; 370/503; 375/373
(58) Field of Classification Search ............... 370/387, 370/532, 533, 537; 375/354–373
See application file for complete search history.

(56) References Cited

U.S. PATENT DOCUMENTS

| | | | | |
|---|---|---|---|---|
| 5,111,455 A | * | 5/1992 | Negus | .................. 370/518 |
| 5,282,210 A | * | 1/1994 | Slegel et al. | ................. 370/537 |
| 7,046,701 B2 | * | 5/2006 | Mohseni et al. | ............. 370/537 |
| 2001/0007436 A1 | * | 7/2001 | Dosho et al. | .................. 331/11 |

* cited by examiner

*Primary Examiner*—Ricky Ngo
*Assistant Examiner*—Kan Yuen
(74) *Attorney, Agent, or Firm*—SoCal IP Law Group LLP; Steven C. Sereboff; John E. Gunther

(57) ABSTRACT

Method and system for a high-speed multiplexer with reduced inter-symbol interference are disclosed. In one embodiment of the present invention, two input bit streams are interleaved by a multiplexer to derive an output bit stream. Each input bit stream is latched by a return-to-differential-zero latch that drives its input bit stream to a neutral state when it is not selected by the multiplexer as output. In an alternate embodiment of the present invention, a pre-selector receives two input signals, determines which of the two input signals will be selected as output of the multiplexer and passes the bit stream unaltered, while passing a differential zero value in place of the unselected input bit stream.

9 Claims, 10 Drawing Sheets

100

METHOD AND SYSTEM FOR TIME DOMAIN MULTIPLEXERS WITH REDUCED INTER-SYMBOL INTERFERENCE

BACKGROUND INFORMATION

1. Field of Invention

The present invention relates to high-speed digital circuits, and more particularly, to high-speed time domain multiplexers with reduced inter-symbol interference.

2. Description of Related Art

High-speed multiplexers operating at several giga-bits-per-second (Gb/s) range are employed in order to exploit the high data transmission rate of today's communication systems.

FIG. 1 is a circuit schematic illustrating a system denoted 100 comprising a conventional bit-interleaved time domain 2:1 multiplexer for high-speed operation, such as used in synchronous optical network/synchronous digital hierarchy (SONET/SDH), Gigabit Ethernet, etc.

System 100 comprises a first and a second bit stream denoted 1 and 3 respectively and a clock signal denoted 5. Circuit 100 further comprises a first and a second edge-triggered latch denoted 7A and 7D respectively, wherein both latches are clocked in phase when clock signal 5 transitions into a first polarity to simultaneously sample new input data from bit streams 1 and 3 respectively.

Moreover, two additional edge-triggered latches denoted 7B and 7E coupled to latches 7A and 7D respectively are clocked in phase when clock signal 5 then transitions into a second polarity opposite that of the first polarity to simultaneously sample output from latches 7A and 7D respectively. Subsequently, a fifth edge-triggered latch denoted 7C is clocked in phase when clock signal 5 once again transitions into the first polarity to sample the output of latch 7B.

Additionally, FIG. 1 shows that the outputs of edge-triggered latches 7C and 7E are coupled to two input signals denoted 8 and 10 respectively. A selector denoted 9 acquires and samples the input signals 8 and 10, and selects one signal from the input signals according to a select input signal denoted 12 coupled to clock signal 5. Selector 9 then produces an output bit stream denoted 11 that interleaves bit streams 1 and 3.

In one instance of operation, select input signal 12 coupled to selector 9 provides a data selection (MUX) operation for selecting, respectively, input 8 when select input signal 12=1, and input 10 when select input signal 12=0.

FIG. 2A illustrates a timing diagram comprising first bit stream 1, second bit stream 3, and clock signal 5 at the input stage of circuit 100. As shown in FIG. 2A, second bit stream 3 comprises 3 data bits denoted 13A, 15A, and 17A; and first bit stream 1 comprises 3 data bits denoted 13B, 15B, and 17B.

FIG. 2B illustrates a timing diagram comprising retimed first bit stream 1 denoted 8, retimed second bit stream 3 denoted 10, and clock signal 5 at the input stage of selector 9. As shown in FIG. 2B, first and second bit streams 1 and 3 are retimed by latches 7A, 7B, 7C, 7D, and 7E such that the bit streams are staggered by 180 degrees of bit rate clock phase.

Furthermore, FIG. 2B shows that selector 9 passes each retimed bit stream on alternating clock polarities wherein bit stream 8 passes as output when clock signal 5=1 as illustrated by arrow 19 and bit stream 10 passes as output when clock signal 5=0 as illustrated by arrow 17, effectively producing an output bit stream 11 by interleaving bit stream 8 and bit stream 10.

Conventional bit interleaving multiplexers such as illustrated in FIG. 1 are designed to interleave bit streams in high-speed communication systems. However, during clock transitions such as illustrated by the clock transition denoted 18 in FIG. 2B, a subtype of inter-symbol interference known as inter-channel interference may occur to the two input stream, whereby a first symbol ("bit") of a first data stream interferes with a second symbol in a second data stream.

Furthermore, the output voltage relies on the state of the present bits of the input bit streams, as well as on the state of previous bits. Therefore, the variability in voltage during the clock transition results in variation in the crossing points of the multiplexer output, and since the critical crossing points define the bit periods of the multiplexer output bit stream, such variability in voltage may cause the crossing points in the multiplexer output to move, which in turn creates timing jitter in the output bit stream of the multiplexer.

Accordingly, there is a need to design a high-speed time domain multiplexer with reduced inter-symbol interference.

SUMMARY OF THE INVENTION

The present invention provides a method and system for high-speed time domain multiplexers with reduced inter-symbol interference.

In one embodiment of the present invention, a first edge-triggered latch and a second edge-triggered latch each samples a first bit stream and a second bit stream respectively, wherein each latch samples its respective bit stream as the clock signal transitions into a first polarity.

Subsequently, a third edge-triggered latch and a fourth edge-triggered latch each samples the output of the first edge-triggered latch and the second edge-triggered latch respectively as the clock signal transitions into a second polarity opposite that of the first polarity. Additionally, a fifth edge-triggered latch samples the output of the third edge-triggered latch as the clock signal transitions back into the first polarity.

Moreover, output of the fourth and the fifth edge-triggered latches are coupled to two inputs of a selector, and the output of the selector is determined by a select input signal comprising the inverse value of the clock signal. The fourth and the fifth edge-triggered latches further comprise return-to-differential-zero latches designed to drive an input to a neutral state (a differential zero) in cases where its respective input bit stream is not chosen by the select input signal as the selector output.

In an alternate embodiment of the present invention, a first edge-triggered latch and a second edge-triggered latch each samples a first bit stream and a second bit stream respectively, wherein each latch samples its respective bit stream as the clock signal transitions into a first polarity.

Subsequently, a third edge-triggered latch samples the output of the first edge-triggered latch as the clock signal transitions into a second polarity opposite to the first polarity. Moreover, the output of the second edge-triggered latch and the output of the third edge-triggered latch are coupled to two inputs of a pre-selector, and the output of the pre-selector is selected by a first select input signal coupled to the clock signal.

Furthermore, the pre-selector drives one of the two outputs to a neutral state and passes one of the data input signals to the other output depending on the value of the select input signal. The two outputs of the pre-selector are coupled in turn to two inputs of a selector, the output of the selector is then determined by a second select input signal comprising a value inverse to that of the clock signal.

BRIEF DESCRIPTION OF THE DRAWINGS

The accompanying drawings that are incorporated in and form a part of this specification illustrate embodiments of the invention and together with the description, serve to explain the principles of the invention.

DETAILED DESCRIPTION

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
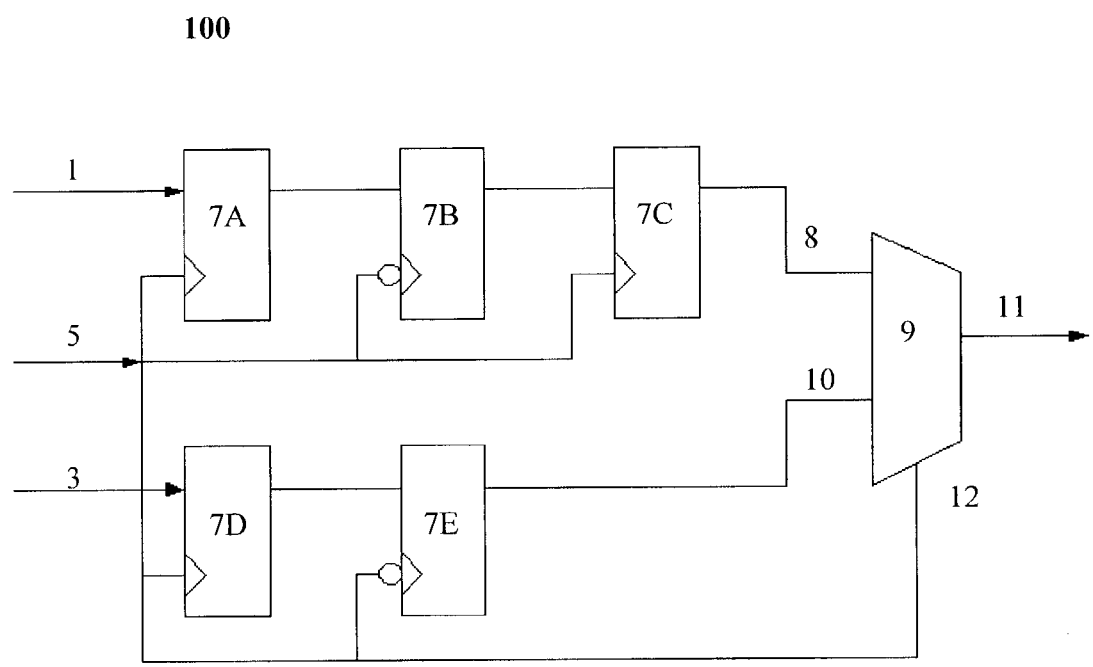
FIG. 1 is a schematic diagram illustrating a prior art system comprising a first bit stream, a second bit stream, a clock signal, and a 2:1 bit interleaving multiplexer.
Figure 2A:
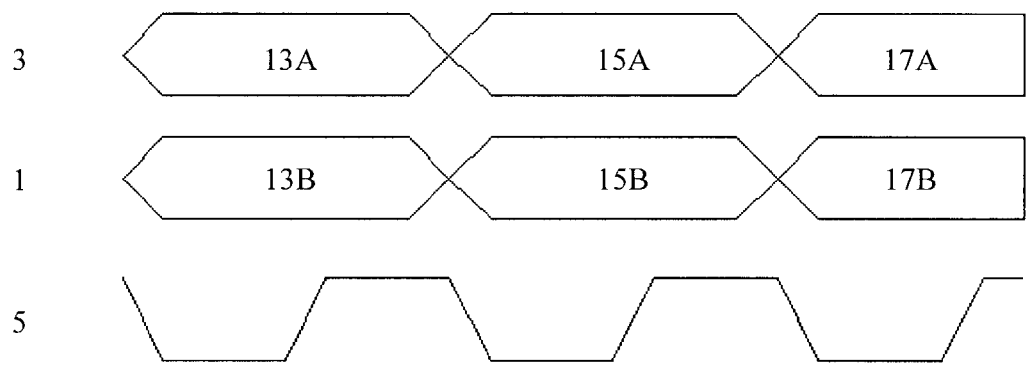
FIG. 2A is a timing diagram illustrating the two input bit streams and the clock signal at the input stage of the system shown in FIG. 1.
Figure 2B:
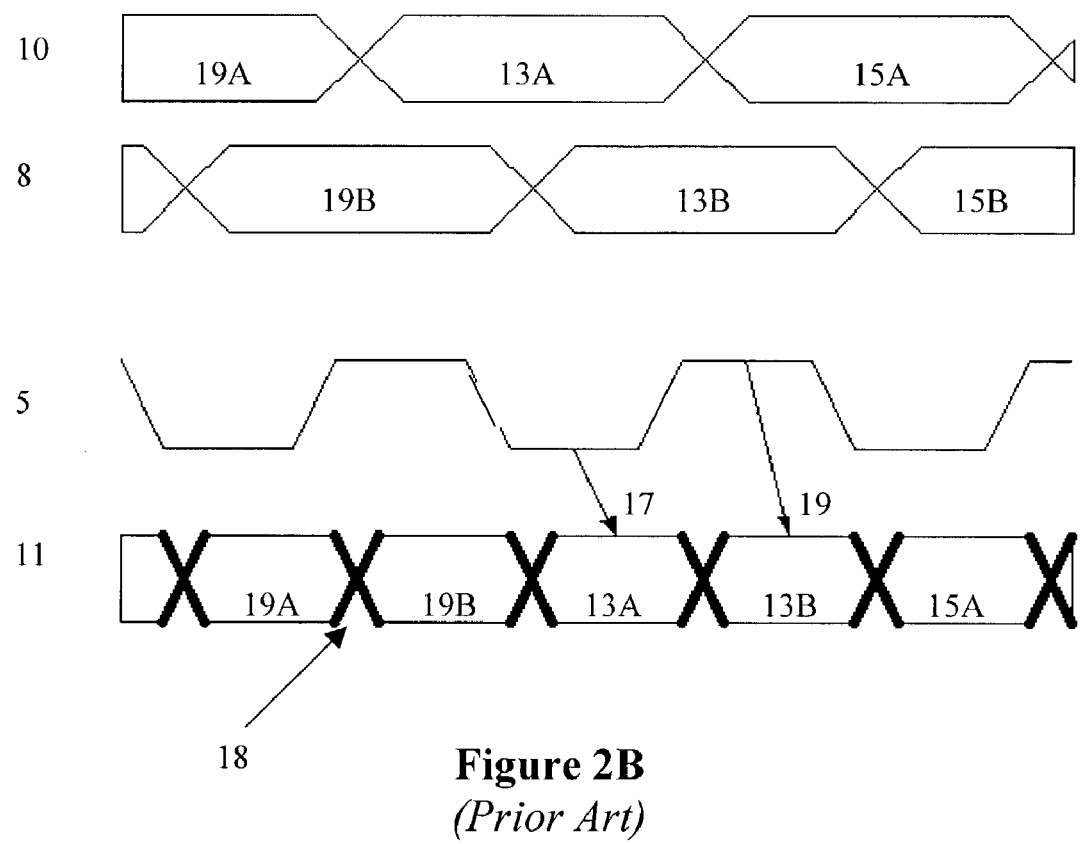
FIG. 2B is a timing diagram illustrating the two input bit streams and the clock signal at the input stage of the multiplexer in FIG. 1.
Figure 3:
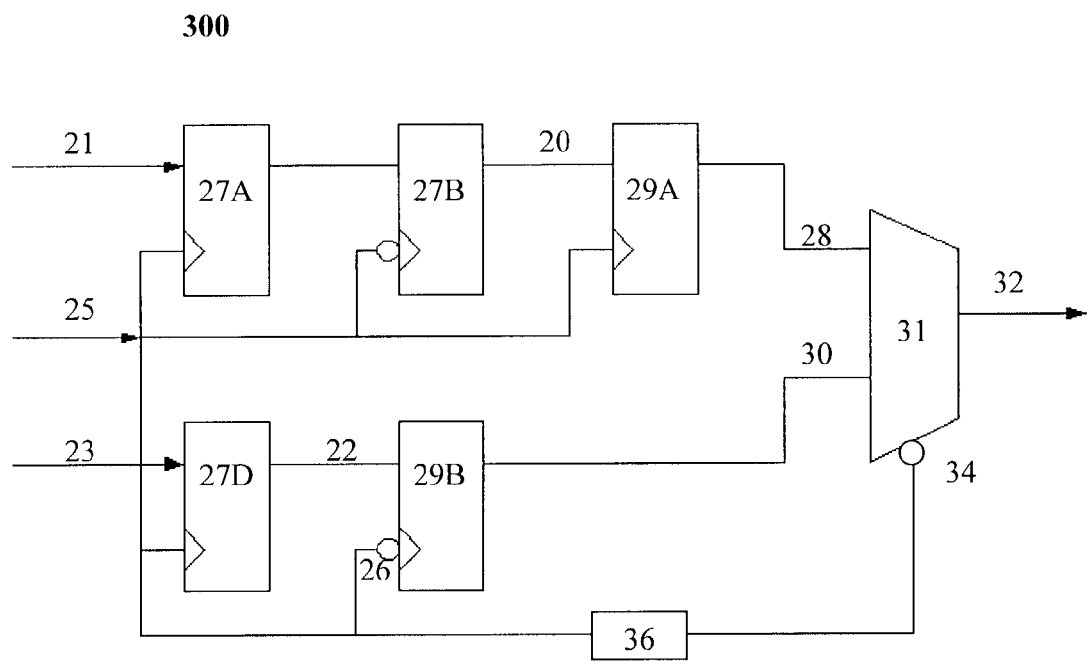
FIG. 3 is a schematic diagram illustrating one embodiment of the present invention wherein one or more return-to-differential-zero latches are implemented in a system in order to reduce inter-symbol interference for a 2:1 multiplexer.

Referring now to FIG. 3, a system denoted 300 illustrating one embodiment of the present invention is described. System 300 comprises a first bit stream denoted 21, a second bit stream denoted 23, and a clock signal denoted 25.

System 300 further comprises a first and a second edge-triggered latch denoted 27A and 27D respectively, wherein both latches are clocked in phase when clock signal 25 transitions into a first polarity to simultaneously sample new input data from bit streams 21 and 23 respectively.

Moreover, two additional edge-triggered latches denoted 27B and 29B coupled to latches 27A and 27D respectively are clocked in phase when clock signal 25 transitions into a second polarity opposite to the first polarity to simultaneously sample outputs from latches 27A and 27D respectively. Subsequently, a fifth edge-triggered latch denoted 29A coupled to latch 27B is clocked in phase when clock signal 25 transitions back to the first polarity to sample the output of latch 27B.

Additionally, FIG. 3 shows that the outputs of edge-triggered latches 29A and 29B are coupled to two input signals denoted 28 and 30 respectively. A selector denoted 31 acquires and samples input signals 28 and 30, and selects one signal from the input signals according to a select input signal denoted 34 comprising a value inverse to that of clock signal 25. Selector 31 then produces an output bit stream denoted 32 that interleaves bit streams 21 and 23.

In one instance of operation, select input signal 34 coupled to selector 31 provides a data selection (MUX) operation for selecting, respectively, input 30 when select input signal 34=1 and clock signal 25=0, and input 28 when select input signal 34=0 and clock signal 25=1.

Furthermore, edge-triggered latches 29A and 29B are return-to-differential-zero latches implemented with low loading capacitance circuits. In cases where the output of a return-to-differential-zero latch is not selected by selector 31 as output, the return-to-differential-zero latch operates to drive its input value to a neutral state before passing the neutralized value as its output. Conversely, in cases where the output of a return-to-differential-zero latch is to be selected by selector 31 as its output, the return-to-differential-zero latch passes its sampled input value unaltered to its output.

Element denoted 36 shown in FIG. 3 is a delay line implemented to compensate for propagation delay retained by return-to-differential-zero latches 29A and 29B.

Although FIG. 3 illustrates one exemplary embodiment of the present invention having five edge-triggered flip flops, it is well understood by those skilled in the arts that the polarity of clock signal 25 may be inverted to eliminate the necessity for edge-triggered latches 27A and 27D.

Figure 4:
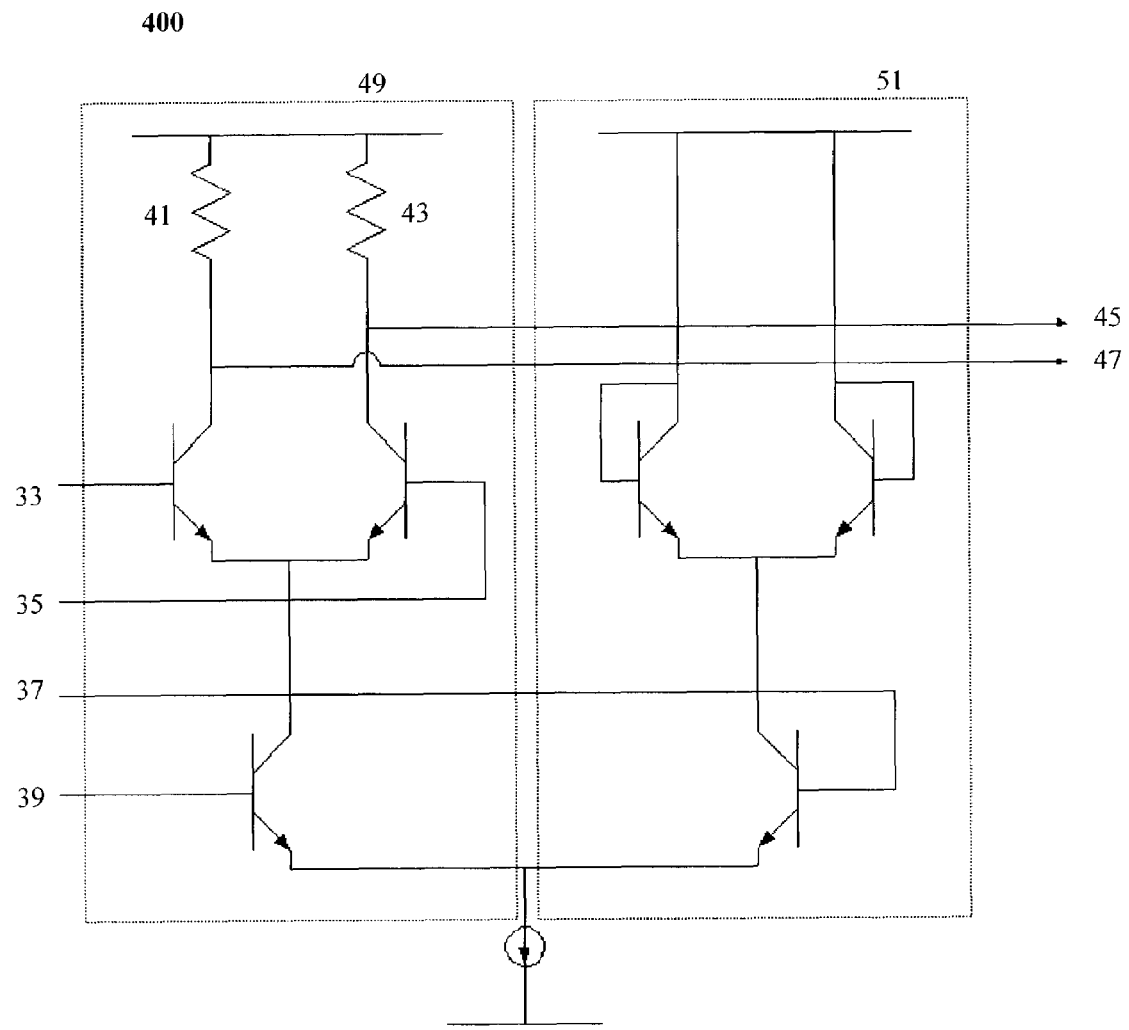
FIG. 4 is an architectural diagram illustrating a return-to-differential-zero latch.

Referring now to FIG. 4, one embodiment of a return-to-differential-zero latch as shown in FIG. 3 is described in an emitter coupled logic configuration (ECL).

The return-to-differential-zero latch shown in FIG. 4 denoted 400 comprises two inputs denoted 33 and 35, wherein input 33 comprising the value of an input sampled by return-to-differential-zero latches such as signals 20 and 22 shown in FIG. 3, and input 35 comprising a value inverse to that of input 33.

Moreover, latch 400 comprises two selecting inputs denoted 37 and 39, wherein input 37 comprising a clock signal of the return-to-differential-zero latch such as signals 25 and 26 shown in FIG. 3, and input 39 comprising a value inverse to that of input signal 37.

Furthermore, latch 400 operates in two modes: acquire and latch. Subsection 49 operates in the acquire mode, wherein the latch operates as a simple differential amplifier, transferring the data from the input signals 33 and 35 to the output signals denoted 45 and 47 respectively.

Conversely, subsection 51 operates in the latch mode, wherein the latch is internally disconnected from the input signals 33 and 35, and the output 45 and 47 are driven to a differential zero where the voltage level is midway between logic high and logic low levels.

Figure 5:
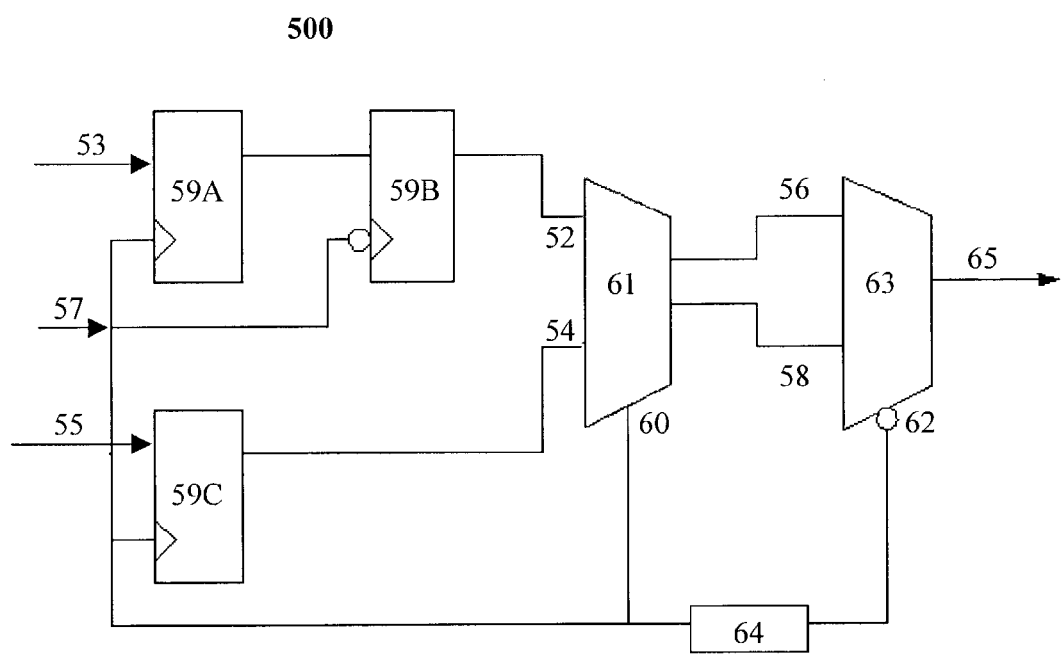
FIG. 5 is a schematic diagram illustrating an alternate embodiment of the present invention wherein a pre-selector is implemented in a system to reduce inter-symbol interference for a 2:1 multiplexer.

Referencing now to FIG. 5, a system denoted 500 illustrating an alternate embodiment of the present invention is described. System 500 comprises a first bit stream denoted 53, a second bit stream denoted 55, and a clock signal denoted 57.

System 500 further comprises a first and a second edge-triggered latch denoted 59A and 59C respectively, wherein both latches are clocked in phase when clock signal 57 transitions into a first polarity to simultaneously sample new input data from bit streams 53 and 55 respectively.

Additionally, a third edge-triggered latch denoted 59B coupled to latch 59A is clocked in phase when clock signal 57 transitions into a second polarity opposite to the first polarity to sample the output of latch 59A.

Subsequently, a pre-selector denoted 61 acquires and samples input signals 52 and 54. Pre-selector 61 selects one of the two input signals as the output signal for a selector denoted 63 according to its select input signal 60 and passes the selected input signal unaltered while producing a differential zero in place of the unselected input signal.

Selector 63 then acquires and samples two output signals 56 and 58, and selects one signal from the two output signals according to a select input signal denoted 62 comprising a value inverse to that of clock signal 57. Selector 63 then produces an output bit stream denoted 65 that interleaves the bit streams 53 and 55.

In one instance of operation, select input signal 62 coupled to selector 63 provides a data selection (MUX) operation for selecting, respectively, input 58 when select input signal 62=1 and clock signal 57=0, and input 56 when select input signal 62=0 and clock signal 57=1.

Element denoted 64 shown in FIG. 5 is a delay line implemented to compensate for propagation delay retained by pre-selector 61.

Although FIG. 5 illustrates one exemplary embodiment of the present invention having five edge-triggered flip flops, it is well understood by those skilled in the arts that the polarity of clock signal 57 may be inverted to eliminate the necessity for edge-triggered latches 59A and 59C.

Figure 6:
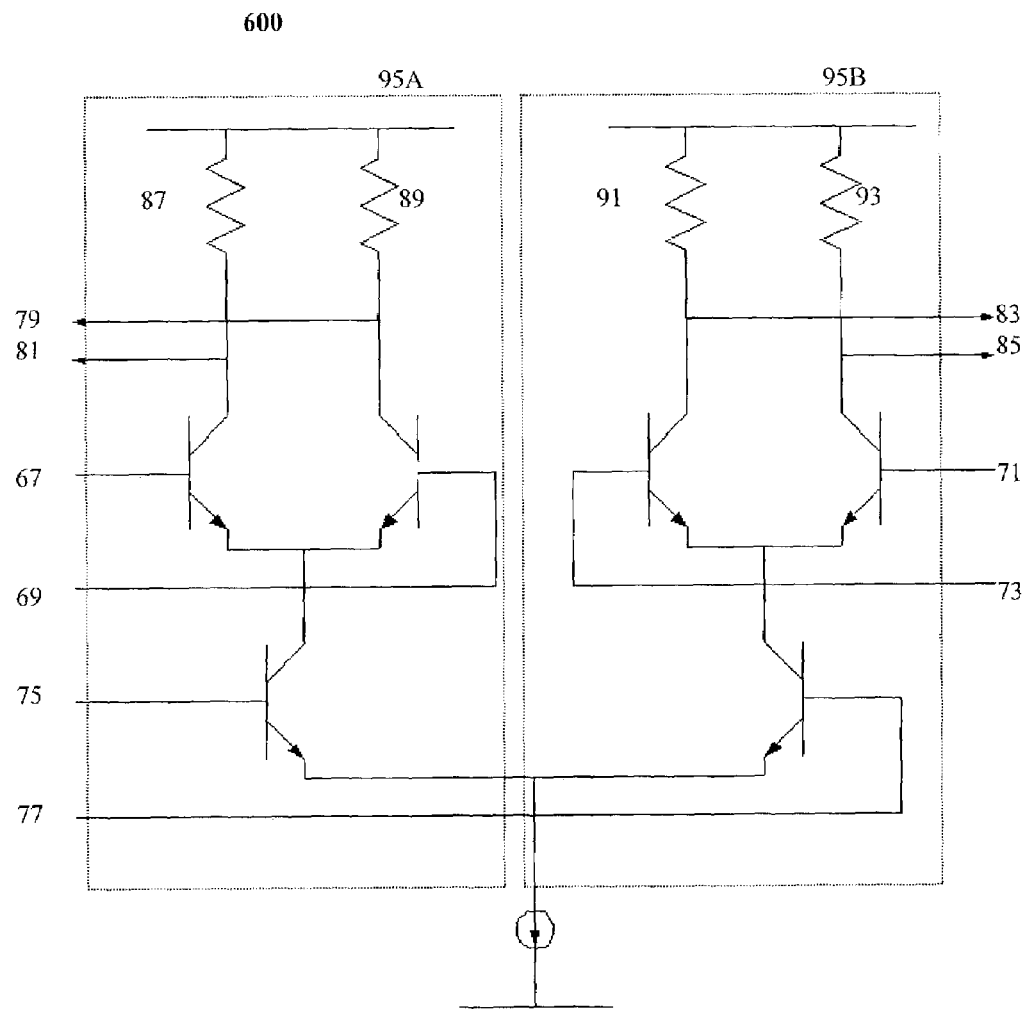
FIG. 6 is an architectural diagram illustrating a pre-selector.

Referring now to FIG. 6, one embodiment of the pre-selector as shown in FIG. 5 is described in an emitter coupled logic configuration (ECL).

The pre-selector shown in FIG. 6 denoted 600 comprises two subsections denoted 95A and 95B respectively. Moreover, sub-section 95A comprises two input signals denoted 67 and 69, wherein input 67 comprising the value of input 52 sampled by pre-selector 61 as shown in FIG. 5, and input 69 comprising a value inverse to that of input 67. Subsection 95B comprises two input denoted 71 and 73, wherein input 71 comprising the value of input 54 sampled by pre-selector 61 as shown in FIG. 5, and input 73 comprising a value inverse to that of input 71.

Pre-selector 600 further comprises two select input signals denoted 75 and 77, wherein signal 75 comprises the value of signal 60 shown in FIG. 5, and input 77 comprises a value inverse to that of signal 75.

In operation, when select signal 75 is high and signal 77 is low, pre-selector 600 passes input signals 67 and 69 to output signals 79 and 81 wherein output 79 comprising the value of output 56 sampled by selector 63 as shown in FIG. 5, and output 81 comprising a value inverse to that of output 79. Simultaneously, pre-selector 600 passes a differential zero to outputs 83 and 85.

Conversely, when select signal 75 is low and signal 77 is high, pre-selector 600 passes input signals 71 and 73 to output signals 83 and 85 wherein output 83 comprising the value of output 58 sampled by selector 63 as shown in FIG. 5, and output 85 comprising a value inverse to that of output 83. Simultaneously, pre-selector 600 passes a differential zero to outputs 79 and 81.

Figure 7A:
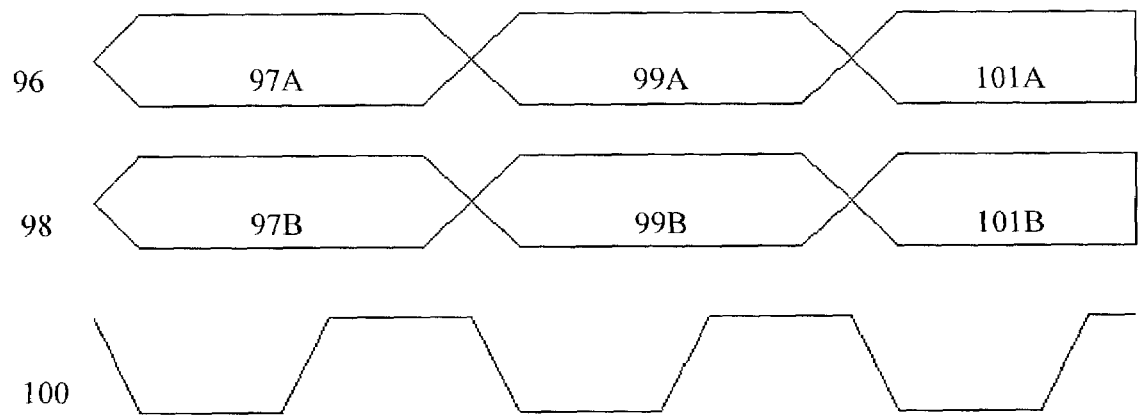
FIG. 7A is a timing diagram illustrating two input bit streams and a clock signal at the input stage of a system comprising a 2:1 multiplexer according to one embodiment of the present invention.

Referring now to FIG. 7A, a timing diagram comprising a first bit stream denoted 96 such as bit stream 23 and bit stream 55 shown in FIGS. 3 and 5 respectively, a second bit stream 98 such as bit stream 21 and bit stream 53 shown in FIGS. 3 and 5 respectively, and a clock signal 100 such as clock signals 25 and 57 shown in FIGS. 3 and 5 respectively, is illustrated.

Moreover, FIG. 7A shows first bit stream 96 comprising data bits 97A, 99A, and 101A; second bit stream 98 comprising data bits 97B, 99B, and 101B, and the clock signal at the input stage of a system according to one embodiment of the present invention.

Figure 7B:
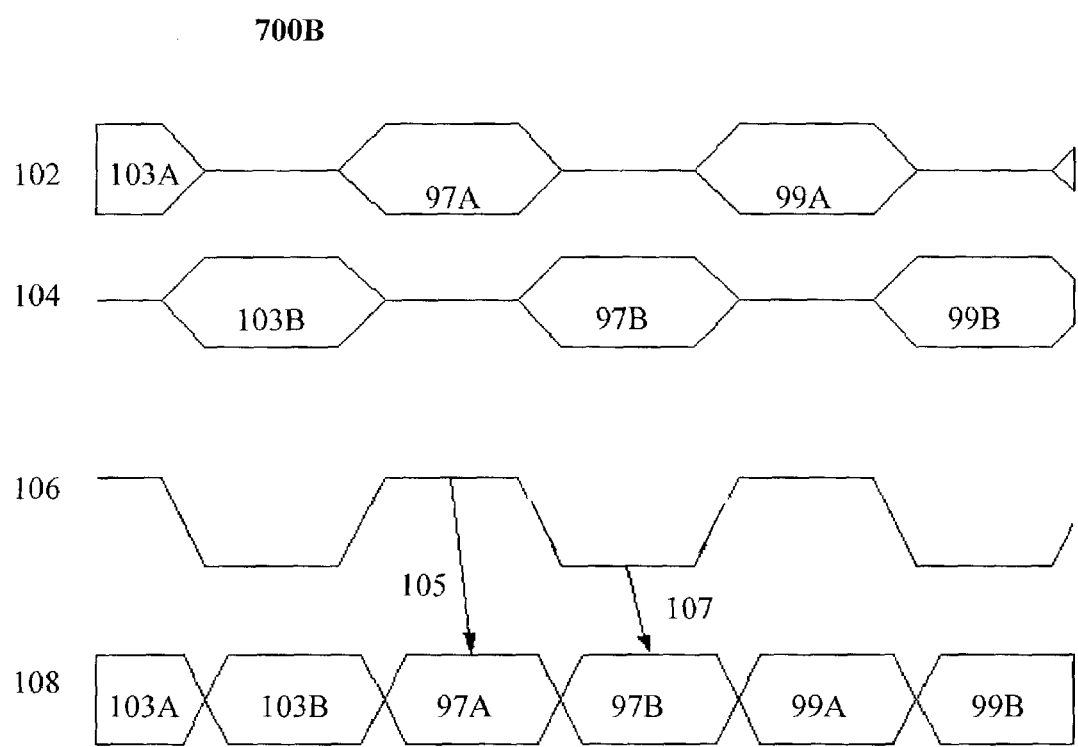
FIG. 7B is a timing diagram illustrating two retimed input bit streams and a delayed clock signal at the input stage of the 2:1 multiplexer according to one embodiment of the present invention.

Referring now to FIG. 7B, a timing diagram showing retimed bit streams 96 and 98 as bit streams 102 and 104 respectively and delayed clock signal 100 as clock signal 106, is illustrated. Moreover, bit stream 102 corresponds to bit stream 30 in FIG. 3 or bit stream 58 in FIG. 5; bit stream 104 corresponds to bit stream 28 in FIG. 3 or bit stream 56 in FIG. 5.

As shown in FIG. 7B, bit stream 96 is retimed to bit stream 102 comprising data bits 103A, 97A, and 99A, bit stream 98 is retimed to bit stream 104 comprising data bits 103B, 97B, and 99B, and clock signal 100 is delayed by elements such as delay lines 36 and 64 shown in FIG. 3 and FIG. 5 respectively. Furthermore, latches such as shown in FIG. 3 and FIG. 5 retime bit stream 102 and 104 in order to stagger the bit streams by 180 degrees.

FIG. 7B further illustrates a multiplexed output bit stream denoted 108 such as output bit streams 32 and 65 as shown in FIG. 3 and FIG. 5 respectively, bit stream 108 comprises interleaves data bits from both bit stream 102 and bit stream 104.

Additionally, multiplexers such as shown in FIG. 3 and FIG. 5 passes data from bit stream 102 when clock signal 106 is high as illustrated by arrow 105, and passes data from bit stream 104 when clock signal 106 is low as illustrated by arrow 107.

Moreover, FIG. 7B shows that bit streams 102 and 104 are driven to differential zero in the clock polarity during which the corresponding bit stream is not passed to output bit stream 108, thereby eliminating any undesirable pattern dependency and rendering the output solely a function of the selected bit stream by nullifying a possible source of output jitter.

Figure 8:
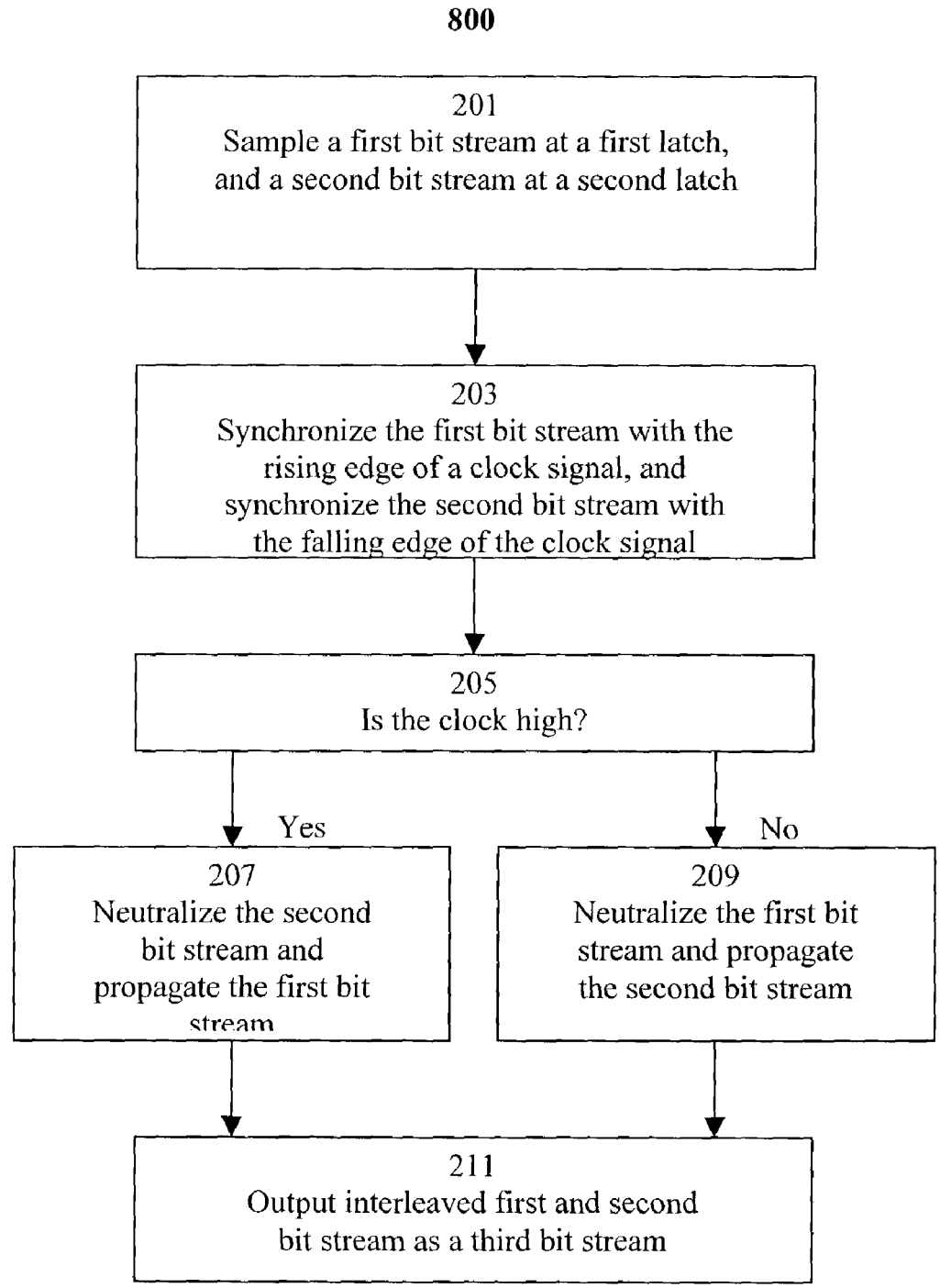
FIG. 8 is a flow diagram illustrating the method steps according to one exemplary embodiment of the present invention.

FIG. 8 illustrates method steps according to one embodiment of the present invention.

In step 201, a first and a second latch driven by a common clock signal sample a first and a second bit stream respectively. Subsequently in step 203, the first and second bit streams are retimed and synchronized with the rising and falling edges of the clock signal respectively.

Step 205 determines the value of the clock, and if the clock signal is high, the first bit stream is propagated to an interleaved output bit stream in Step 207, while the second bit stream is neutralized to a differential zero state.

Conversely, if the clock is low, the second bit stream is propagated to an interleaved output bit stream in Step 207, while the first bit stream is neutralized to a differential zero state.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the arts to best utilize the invention and various embodiments with various modifications as are suited for the particular use contemplated. It is intended that the scope of the invention be defined by the Claims appended hereto and their equivalents.

For example, although only 2:1 multiplexers are illustrated, it is commonly understood by those skilled in the art that such multiplexers as described may be employed as building blocks to other multiplexers such as 4:1 multiplexers and 8:1 multiplexers.

Moreover, although FIG. 4 and FIG. 6 illustrate embodiments comprising bipolar transistors implemented in emitter coupled logic configurations, other transistors and configurations such as field effect transistors and source-coupled logic configurations may be implemented in place.

Additionally, numerical values 0 and 1 symbolize a logical low and a logical high respectively, and details such as delays lines 36 and 64 are implemented to suit parameters of a specific design and may be altered as desired for alternate designs.

I claim:

1. A multiplexer, comprising:
    a first latch having a first input for receiving a first bit stream and a second input for receiving a clock signal, wherein the first latch is an edge-triggered latch clocked in phase when the clock signal transitions into a first polarity to transmit input data from the first data stream, and latch the input data when the clock signal transitions into a second polarity;
    a first return-to-differential-zero latch coupled to the first latch, the first return-to-differential-zero latch having a first input for receiving an output of the first latch and a second input for receiving a clock signal,
        wherein the first return-to-differential-zero latch is an edge-triggered latch clocked in phase when the clock signal transitions into a second polarity to transmit output data from the first latch, and
        wherein the first return-to-differential-zero latch has an output comprising the value of the output of the first latch when the first return-to-differential zero latch receives a clock signal of the second polarity and comprising a neutral value when the first return-to-differential-zero latch receives a clock signal of the first polarity;
    a second return-to-differential-zero latch having a first input for receiving a second bit stream and a second input for receiving a clock signal, wherein the second return-to-differential-zero latch is an edge-triggered latch clocked in phase when the clock signal transitions into the first polarity to transmit input data from the second bit stream; and
    a selector having a first input coupled to the output of the first return-to-differential-zero latch and a second input coupled to the output of the second return-to-differential-zero latch, and a third input for receiving a select input signal.

2. The multiplexer of claim 1, wherein the second return-to-differential-zero latch having an output comprising the value of the second data stream input when the second return-to-differential-zero latch receives a clock signal of the first polarity, and comprising a neutral value when the second return-to-differential-zero latch receives a clock signal of the second polarity.

3. The multiplexer of claim 2, wherein the select input signal comprising a value inverse to that of the clock signal; such that the output of the first return-to-differential-zero latch is passed to the selector output when receiving a clock signal of the second polarity; and the output of the second return-to-differential-zero latch is passed to the selector output when receiving a clock signal of the first polarity.

4. The multiplexer of claim 3, wherein the selector having an output data bit stream.

5. The multiplexer of claim 4, wherein the output data bit stream is a result of interleaving the data bits of the first bit stream with the data bits of the second bit stream.

6. A multiplexer, comprising:
    a first latch having a first input for receiving a first bit stream and a second input for receiving a clock signal, wherein the first latch is an edge-triggered latch clocked in phase when the clock signal transitions into a first polarity to transmit input data from the first data stream, and latch the input data when the clock signal transitions into a second polarity;
    a pre-selector coupled to the first latch, the pre-selector having a first input for receiving an output of the first latch, a second input for receiving a second bit stream, a third input for receiving a first select input signal comprising the value of the clock signal, a first output, and a second output,
        wherein the first output comprising the value of the output of the first latch and the second output comprising a neutral value when the pre-selector receives a clock signal of the second polarity, and
        wherein the second output comprising the value of the second bit stream and the first output comprising a neutral value when the pre-selector receives a clock signal of the first polarity; and
    a selector coupled to the pre-selector, the selector having a first input for receiving a first output of the pre-selector, a second input for receiving a second output of the pre-selector, and a third input for receiving a second select input signal.

7. The multiplexer of claim 6, wherein the second select input signal comprising a value inverse to that of the clock signal; such that the first output of pre-selector is passed to the selector output when receiving a clock signal of the second polarity; and the output of the second output of the pre-selector is passed to the selector output when receiving a clock signal of the first polarity.

8. The multiplexer of claim 7, wherein the selector having an output data bit stream.

9. The multiplexer of claim 8, wherein the output data bit stream is a result of interleaving the data bits of the first bit stream with the data bits of the second bit stream.

* * * * *